Figure 1:
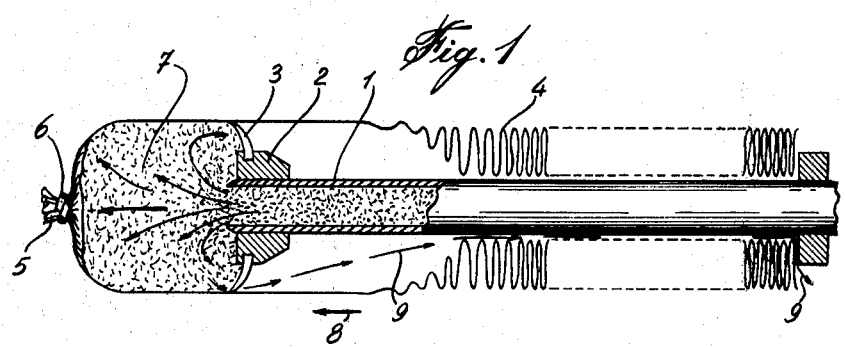

United States Patent [19]

Marz

[11] 4,321,728

[45] Mar. 30, 1982

[54] GLAND SEAL FOR STUFFER HORN

[75] Inventor: Horst F. Marz, Otterburn Park, Canada

[73] Assignee: C-I-L Inc., Montreal, Canada

[21] Appl. No.: 148,568

[22] Filed: May 9, 1980

[30] Foreign Application Priority Data

May 25, 1979 [CA] Canada ................................ 328340

[51] Int. Cl.³ ............................................. A22C 11/02
[52] U.S. Cl. ........................................ 17/41; 53/576; 141/311 R
[58] Field of Search ................ 53/550, 551, 552, 553, 53/554, 567, 576; 17/35, 41, 42; 141/10, 114, 313, 392, 311 R, 316

[56] References Cited

U.S. PATENT DOCUMENTS

| | | | |
|---|---|---|---|
| 1,518,511 | 12/1924 | Henderson | 17/41 |
| 3,929,175 | 12/1975 | Coone | 141/392 X |
| 3,975,795 | 8/1976 | Kupcikevicius | 17/41 |
| 4,044,425 | 8/1977 | Nausedas | 53/439 |
| 4,139,032 | 2/1979 | Taylor | 141/392 X |

*Primary Examiner*—John Sipos
*Attorney, Agent, or Firm*—Donald G. Ballantyne

[57] ABSTRACT

An improved gland seal is provided for an extrusion, chub container packaging apparatus. The seal comprises a rigid ring sealing element adapted to swivel upon a ball-like holder attached to the end of the filling horn. The sealing element may be simply positioned to compensate for variations in casing diameters and is not subject to expansion caused by pressure pulses during packaging. Package breakage and malformation is reduced and a uniform product is provided.

4 Claims, 3 Drawing Figures

U.S. Patent  Mar. 30, 1982  4,321,728

GLAND SEAL FOR STUFFER HORN

This invention relates to the manufacture of chub packages or sausage-like containers of slurry or paste-like products.

Typical slurry or paste-like products may be, for example, comminuted meat, cheese, explosives and the like. In particular, the invention relates to an improved means whereby the paste-like product extruded under pressure from the filling horn of an extrusion packaging apparatus into a tubular casing is prevented from flowing into the unfilled portion of a casing which is retained in shirred form upon the filling horn or mandrel of the packaging apparatus.

Two main problems which face industries manufacturing products in sausage-type or chub-type casings or containers, have been to reduce or eliminate the back-flow of extruded product from the filled portion of the casing into the unfilled portion of the casing and to keep the hold-back or braking of the casing constant during filling since this largely determines the internal pressure and density of the final package. Such a back-flow can lead to leakage and loss of product as well as to impaired extruder operation and hence is desirably avoided. In explosives packaging in particular it is essential that any spillage or contamination is prevented.

The present invention provides an improved gland seal between the filling horn and the interior tubular casing wall in a flexible casing stuffing apparatus, which gland seal comprises a solid ball-like element affixed to the discharge end of the tubular filling horn, the ball element having a channel therethrough in alignment with the tubular passage in the horn and of substantially the same cross-sectional size.

The ball element has mounted in swivel fashion thereon a ring-like element, which ring-like element is adapted to occupy the space between the ball element and the inner wall of a flexible tubular casing and thus seal off the back-flow of any of the extruded product.

Figure 2:
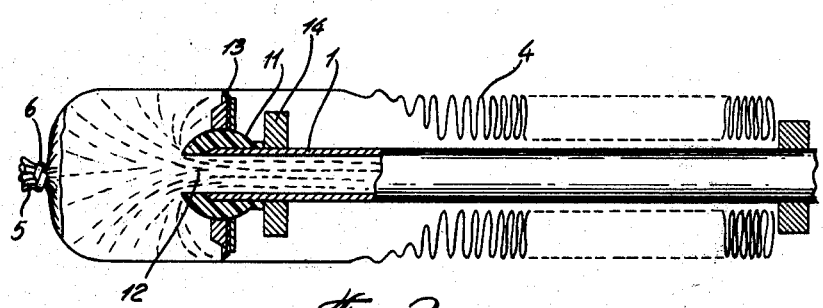
Figure 3:
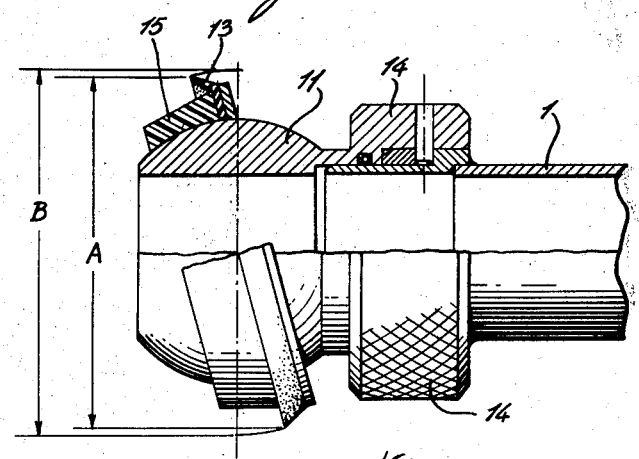

The invention will be more fully understood by reference to the accompanying drawing wherein FIG. 1 shows in sectional view a conventional or prior art arrangement for sealing off or retaining extruded product within the filled portion of a flexible tubular casing;

FIG. 2 shows in sectional view an improved sealing arrangement according to the present invention; and, FIG. 3 shows in partly sectional view an enlarged view of the gland seal of FIG. 2.

With particular reference to FIG. 1, there is shown a hollow filling horn 1 over which is drawn a shirred stick 4 of tubular film packaging material. Film 4 is shown with a closure clip or tie 6 at gathered end 5. At the end of horn 1 is affixed a flexible, resilient, cup-type gland 3 of rubber or similar material mounted in a holder 2. Extruded product 7, for example, comminuted meat or slurry explosives, is shown being extruded from horn 1 to fill casing 4. Arrow 9 shows the route or direction taken by any product 7 which may escape between resilient gland 3 and the inner wall of casing 4.

With reference to FIG. 2, a hollow filling horn 1 is shown over which is drawn a shirred stick 4 of tubular casing material. As in FIG. 1, tube end 5 is gathered at closure clip 6. At the end of horn 1 is ball element 11 having a channel 12 therethrough. Ball element 11 is firmly affixed to horn 1 by a fast lock such as a bayonet lock. Mounted in swivel relationship upon ball element 11 is rigid gland seal element or ring 13. The diameter of seal ring 13 is preferably slightly greater than the inner diameter of casing 4 in order to provide tight fitting contact with the walls of casing 4.

With reference to FIG. 3, there is shown horn 1 to the end of which is affixed ball element 11. A fast-lock holder 14 is shown by which means ball element 11 can be secured to or removed from horn 1. Rigid gland seal element or ring 13 is shown in a tilted or non-perpendicular mode, thus describing a reduced diameter as shown by arrow A. When in this position, element 13 provides for easy passage of casing material 4 as it is slipped over element 13 and shirred on horn 1 as shown in FIG. 2. Prior to the operation of the packaging cycle and the extrusion of product through horn 1, element 13 is moved to a perpendicular mode or position thus describing a diameter as shown by arrow B. In this position, element 13 provides close frictional contact against tubing 4 as shown in FIG. 2. When pre-shirred sticks of casing are employed, ball element 11 and attached ring element 13 can be quickly and simply disconnected from horn 1 to allow slipping of the stick on to horn 1. Thereafter the unit comprising elements 11 and 13 is easily connected to the end of horn 1. As is shown, seal element 13 is assembled around ball element 11 where it is held in a chosen axial position by means of a circular retaining ring 15 fastened to seal 13 by, for example, screws 17. The inner ring portions of element 13 in contact with ball element 11 are machined to conform to the curvature of element 11 and a resilient seal 18 between elements 13 and 15 provides substantially leak-proof yet movable contact therebetween. It has been found that during extrusion of the product to be packaged, the pressure of the extruded material is exerted equally around the entire forward face of the sealing ring element. Thus there is substantially no tendency for the element to swivel or more on the ball element during extrusion and tight sealing contact is maintained between the seal ring element 13 and the tubular casing material.

The material of construction of the ball element 11 and ring seal element 13 and retaining ring 15 may be any material which resists wear. In addition, resistance against corrosion from the product being packaged, e.g. a salt-containing slurry explosive, requires consideration in selecting construction material. It has been found that ball element 11 may be conveniently made from high density plastics material such as nylon or "Delrin" (Registered Trade Mark), while ring seal element 13 and retaining ring 15 are preferably metallic, for example, stainless steel or anodized aluminum, in order to resist wear from the contact passage of the film material.

An important advantage of the seal gland of the present invention is that unlike the flexibe rubber cup-type gland of the prior art, its braking effect on the forward advance of the casing material is more uniform and less effected by pressure pulses resulting from fluctuations from the action of the filling pump. The prior art cup seal tends to be particularly sensitive to pressure pulses because expansion of the cup results in increased friction against the casing and can lead to malformed or burst packages. The gland seal of the present invention, on the other hand does not expand under pressure and results in the production of uniform packages. In addition, the present seal may be easily adapted to account for differences in casing diameter from stick to stick by swivelling the seal to a position which compensates for a difference in the casing diameters. Advantage can be taken of the resilient or flexible nature of the casing material by providing a ring element which is slightly larger in diameter than the diameter of the casing material which coupled with the rigidity of the ring seal element, provides for leak-proof contact between ring element and casing wall.

What we claim is:

1. In combination with an extrusion chub container packaging apparatus having a filling horn over which a tubular packaging material is drawn, said horn having a filling passage and a gland sealing means adapted to engage an inner wall surface of said chub packaging material during extrusion filling thereof, an improved gland seal comprising:
   (a) a spherical element attached to the outlet end of the filling horn, said element having a passage therethrough in alignment with the filling horn, passage and
   (b) a sealing ring element swivelly mounted upon the peripheral surface of said spherical element and radially extending therefrom to occupy the space between said spherical element and the inner wall of the surrounding tubular film material; said sealing element having at its radially outermost end means inclined to said package inner wall and contacting said package inner wall to form said gland seal.

2. A gland seal as claimed in claim 1 wherein the attachment of the said spherical element to the said filling horn is a quick connect-disconnect attachment.

3. A gland seal as claimed in claim 1 wherein the said spherical element is comprised of a high density plastic material.

4. A gland seal as claimed in claim 1 wherein the material of the said sealing ring element is selected from stainless steel or anodized aluminium.

* * * * *